US011043044B2

(12) United States Patent
Adams

(10) Patent No.: US 11,043,044 B2
(45) Date of Patent: Jun. 22, 2021

(54) SYSTEMS AND METHODS FOR VEHICLE CONDITION INSPECTION FOR SHARED VEHICLES

(71) Applicant: BlackBerry Limited, Waterloo (CA)

(72) Inventor: Neil Patrick Adams, Waterloo (CA)

(73) Assignee: BlackBerry Limited, Waterloo (CA)

(*) Notice: Subject to any disclaimer, the term of this patent is extended or adjusted under 35 U.S.C. 154(b) by 147 days.

(21) Appl. No.: 16/209,212

(22) Filed: Dec. 4, 2018

(65) Prior Publication Data
US 2020/0175783 A1 Jun. 4, 2020

(51) Int. Cl.
G07C 5/00 (2006.01)
B60R 21/0136 (2006.01)
G06T 7/00 (2017.01)
G07C 5/08 (2006.01)

(52) U.S. Cl.
CPC .......... G07C 5/008 (2013.01); B60R 21/0136 (2013.01); G06T 7/001 (2013.01); G07C 5/0808 (2013.01); G06T 2207/30252 (2013.01); G06T 2207/30268 (2013.01)

(58) Field of Classification Search
None
See application file for complete search history.

(56) References Cited

U.S. PATENT DOCUMENTS

| 10,223,844 | B1 * | 3/2019 | Schwie | G08B 17/10 |
| 2006/0132291 | A1 | 6/2006 | Dourney, Jr. et al. | |
| 2008/0079554 | A1 | 4/2008 | Boice | |
| 2010/0127133 | A1 | 5/2010 | Schrevere et al. | |
| 2014/0309805 | A1 * | 10/2014 | Ricci | G06Q 20/308 701/1 |
| 2014/0313334 | A1 | 10/2014 | Slotky | |
| 2016/0140778 | A1 | 5/2016 | Bailly et al. | |
| 2017/0045890 | A1 * | 2/2017 | Gurin | H04N 7/185 |
| 2019/0265703 | A1 * | 8/2019 | Hicok | G05B 13/027 |

FOREIGN PATENT DOCUMENTS

| CN | 105069736 | 11/2015 |
| JP | 2006195715 | 7/2006 |

OTHER PUBLICATIONS

Extended European Search Report, European Patent Application No. 19213041.7 dated Feb. 17, 2020.

* cited by examiner

Primary Examiner — Tamara L Weber
(74) Attorney, Agent, or Firm — Rowand LLP

(57) ABSTRACT

Systems and methods for managing a condition of a vehicle based on initial image data. The initial image data depicts an initial condition of a physical component of the vehicle. The system includes an image sensor and an environment sensor. The system includes processor-executable instructions to detect, via the environment sensor, an environment condition corresponding to a potential vehicle damaging event. In response to detecting the environment condition, the system generates, via the image sensor, just-in-time image data of the physical component of the vehicle. The system compares the just-in-time image data and the initial image data to identify a vehicle condition change. In response to identifying a vehicle condition change, the system transmits, to a computing device, the just-in-time image data.

18 Claims, 5 Drawing Sheets

SYSTEMS AND METHODS FOR VEHICLE CONDITION INSPECTION FOR SHARED VEHICLES

FIELD

The present application generally relates to vehicle inspection and, in particular, to systems and methods of vehicle condition inspection for shared vehicles.

BACKGROUND

Vehicle rental or sharing services offer consumers convenient or cost effective opportunities for utilizing vehicles without needing to make a substantial monetary expenditure. Vehicle rental facilities are commonly located near airport arrival terminals or in urban areas, where consumers can rent a vehicle on a daily, weekly, or monthly basis. Vehicle share programs, such as ZipCar™ or other similar services, offer vehicle sharing arrangements. In some examples, vehicle fuel and insurance costs are included. Vehicle share programs can place vehicle pick-up/drop-off stations at one or more locations throughout a city (e.g., at shopping malls, apartment/condominium parking garages, etc.). Consumers can identify a desired vehicle, identify a desired pick-up location, and utilize the vehicle for a desired duration of time (e.g., hourly, daily, monthly, etc.).

Vehicle rental companies and companies offering car sharing services expend significant time and monetary resources to ensure the vehicles they offer are in good physical and operating condition. To do so, these companies conduct vehicle inspections for documenting vehicle condition when a consumer picks up the vehicle and when the consumer returns/drops off the vehicle. The consumer can be charged for any identified damage that may occur between the time a consumer picks up the vehicle and when the consumer returns the vehicle. Vehicle rental companies commonly look for body panel dents, scratches, wheel damage, odour damage (e.g., cigarette smoke), upholstery tears, etc. The vehicle inspection process is commonly a manual process. Further, the inspection process is often rushed and the consumer may not be provided with ample opportunity to agree to an initial condition of the vehicle, thereby promulgating potential disputes as to whether the consumer should bear the costs of identified damage.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
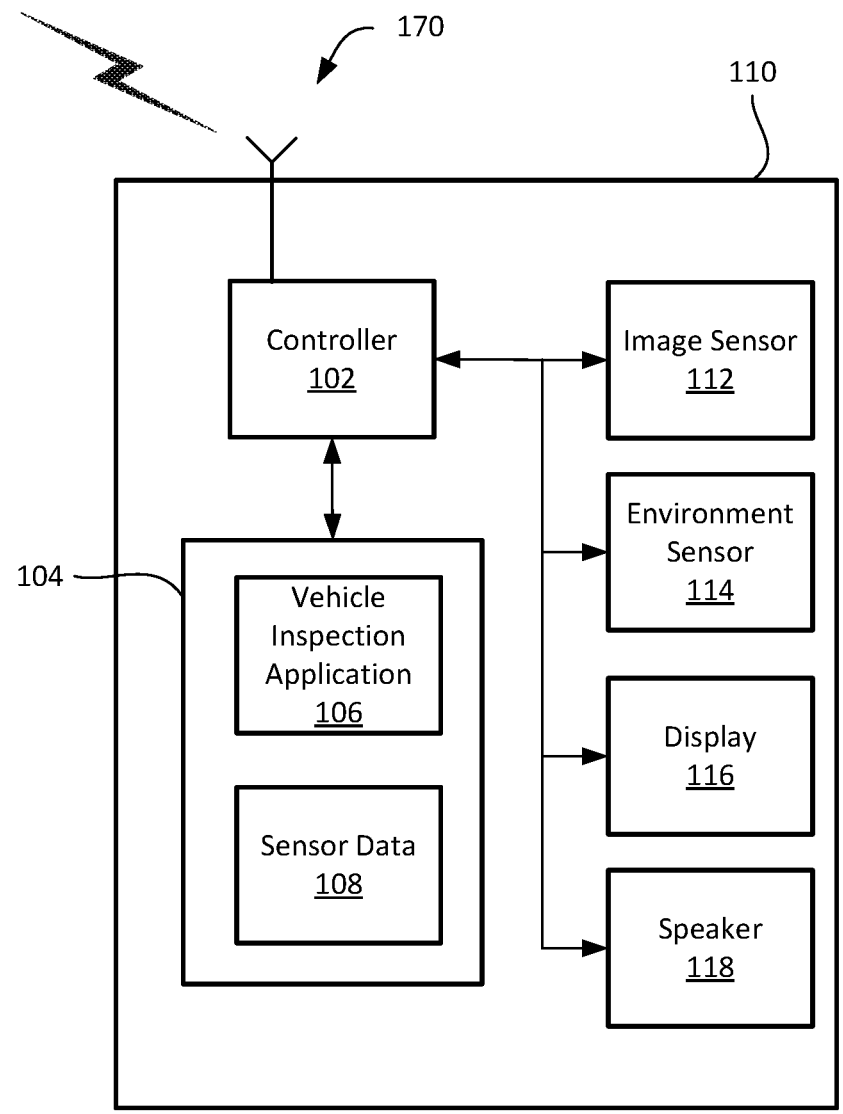
FIG. 1 illustrates, in block diagram form, a simplified vehicle, in accordance with an example of the present application.

In a first aspect, the present application describes a vehicle inspection system for managing a condition of a vehicle based on initial image data. The initial image data depicts an initial condition of a physical component of the vehicle. The system includes a processor, an image sensor coupled to the processor, an environment sensor coupled to the processor, and a memory coupled to the processor. The memory stores processor-executable instructions that, when executed, cause the processor to: detect, via the environment sensor, an environment condition corresponding to a potential vehicle damaging event and, in response, generate, via the image sensor, just-in-time image data of the physical component of the vehicle; compare the just-in-time image data and the initial image data to identify a vehicle condition change; and in response to identifying a vehicle condition change, transmitting, to a computing device, the just-in-time image data.

In another aspect, the present application describes a method of managing a condition of a vehicle based on initial image data. The vehicle includes an image sensor and an environment sensor. The initial image data depicts an initial condition of a physical component of the vehicle. The method includes: detecting, via the environment sensor, an environment condition corresponding to a potential vehicle damaging event and, in response, generating, via the image sensor, just-in-time image data of the physical component of the vehicle; comparing the just-in-time image data and the initial image data to identify a vehicle condition change; and in response to identifying a vehicle condition change, transmitting, to a computing device, the just-in-time image data.

In yet a further aspect, the present application describes non-transitory computer-readable storage medium storing processor-readable instructions that, when executed, configure a processor to perform one or more of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Vehicle rental facilities are commonly located near airport arrival terminals or in urban areas. Vehicle rental facilities can have large capacity parking facilities to offer numerous vehicle renters access to rental vehicles. Vehicle share programs, such as ZipCar™ or other similar services, provide vehicle pickup/drop off locations in a number of convenient locations throughout a region, such as at shopping malls, apartment/condominium parking garages, etc. As respective vehicle share pickup/drop off locations may only have a limited number of parking spaces (e.g., 2 to 10 spaces for vehicles), vehicle share programs may not employ dedicated vehicle inspection resources at the respective vehicle pickup/drop off locations for vehicle inspection. The vehicles may only be periodically inspected and the vehicle share companies may bear the cost of vehicle damage caused by a user. Further, as vehicle share programs are based on platforms that offer electronic reservations via computer networks, vehicle sharing programs may not have brick-and-mortar facilities at the respective vehicle pickup/drop off locations.

Vehicle rental companies and companies offering car sharing services may conduct manual vehicle inspections. In some scenarios, a vehicle condition is documented when the consumer picks up the vehicle. An initial vehicle condition report can include a record of pre-existing vehicle damage prior to the consumer picking up the vehicle. Upon returning the vehicle, a subsequent vehicle inspection is conducted to identify any undocumented damage. The undocumented damage may be charged back to the consumer.

Before the consumer is provided with vehicle keys or access to operate the vehicle, some systems utilize image capture devices for documenting an initial vehicle condition and a post-rental vehicle condition. The image capture devices may be hand operated devices and the pre-rental condition image data can be based on substantially different camera angles or lighting conditions than camera angles or lighting conditions of the post-rental condition image data. Accordingly, it can be challenging to perform a comparison of the "before condition" and the "after condition" when the image conditions may substantially differ.

Further, systems that rely on image capture devices for documenting the pre-rental condition and the post-rental condition can lead to the vehicle rental company bearing costs of latent discovery of vehicle damage. For example, physical damage (e.g., minor dents, scratches, etc.) to a vehicle exterior may occur early in the vehicle rental time duration; however, if the vehicle exterior becomes soiled (e.g., dirt, winter road salt, etc.), the image captures of the "after condition" may not reveal the physical damage until such time that the vehicle is washed. In another example, odour damage (e.g., cigarette smoke, cigar smoke, etc.) to the vehicle interior may occur early in the vehicle rental time duration; however, if the vehicle renter applies an odour masking product (e.g., fragrance product, etc.) prior to returning the vehicle, the post-rental vehicle inspection may not detect the odour damage, even though the odour damage may already have ruined the vehicle upholstery. After the vehicle renter has paid for the rental and after the vehicle has been processed, vehicle companies may be unable to retroactively attribute latent discovery of vehicle damage to a prior vehicle renter.

The present application describes systems and methods to detect unordinary environment conditions that can result in vehicle damage during a vehicle rental duration of time and generate just-in-time image data of the physical portion of the vehicle representing a subsequent vehicle condition that can be compared to initial sensor data representing an initial vehicle condition. The just-in-time image data represents the vehicle condition at a time near the occurrence of a potential vehicle damaging event.

Reference is made to FIG. 1, which illustrates, in block diagram form, a simplified vehicle 110, in accordance with an example of the present application. The vehicle 110 includes a controller 102. The controller 102 includes one or more processors, memory, executable program instructions, and various input, output, and communication subsystems. The vehicle 110 may include one or more wireless antennas 170 to enable wireless communication with remote computing devices, including through cellular data communications, wireless local area networks, dedicated short-range communications (DSRC), or any other wireless communications protocol. The controller may be implemented by, or a part of, the vehicle electronic computer system that control various aspects of the vehicle operations and a plurality of sensors that gather vehicle data.

In examples described herein, vehicles can be motor vehicles (e.g., automobiles, cars, trucks, buses, motorcycles, etc.), aircrafts (e.g., airplanes, helicopters, unmanned aerial vehicles (UAV), unmanned aircraft systems, drones, etc.), spacecrafts (e.g., spaceplanes, space shuttles, space capsules, space stations, etc.), watercrafts (e.g., ships, boats, hovercrafts, submarines, etc.), railed vehicles (e.g., trains, trams, etc.), or other types of vehicles including any combinations of the foregoing.

The vehicle 110 can include one or more image sensors 112 positioned on the vehicle for capturing one or more images of physical component of the vehicle. For example, an image sensor 112 can be an image capture device that is positioned at a side view mirror. The image sensor 112 can be oriented to have a field of view to capture images of the external portions of the vehicle. For example, the image sensor 112 can be oriented to capture image data of a door panel, a quarter panel, a fender, a wheel rim/tire, a windshield/window, or any other physical component on the vehicle that may be damaged during the course of vehicle operation or when the vehicle is parked in a parking facility.

In some examples, the image sensor 112 can be an in-vehicle image sensor for capturing image data of the vehicle interior. That is, the image sensor 112 can be positioned on an in-vehicle center rear view mirror and have a field of view covering the passenger cabin of the vehicle. The image sensor 112 can include other example image capture devices that can be mounted at any other position on the vehicle 110 for capturing image data of the physical condition of the vehicle. Image data can be associated with time stamps or other time data such that the image data can be compared with image data associated with a subsequent or future time for identifying changes to the vehicle condition.

The vehicle 110 can include one or more environment sensors 114. An environment sensor 114 can detect environment conditions and generate data for determining whether the environment conditions meet specified threshold values. For example, the environment delta sensor 114 can be an electronic nose sensor or airborne irritant sensor (or detector) for detecting airborne irritants. Some airborne irritants can include cigarette smoke, cigar smoke, etc. In some examples, the airborne irritant sensor can generate data for determining whether the level of detected airborne irritants exceeds a specified irritant threshold value. In examples, rental vehicle companies or vehicle sharing programs may deem cigarette or cigar smoking as a prohibited in-vehicle activity. The environment sensor 114 can be configured to detect cigarette smoke or cigar smoke. In some examples, in response to detecting the airborne irritant, the controller 102 can generate, via the image sensor 112, image data of the vehicle interior or the vehicle passenger cabin for identifying the source of the airborne irritant. In examples where one or more vehicle occupants are engaged in smoking within the vehicle, the image sensor 112 can generate image data for displaying images of the vehicle occupant participating in the prohibited in-vehicle activity, thereby providing documented proof that the vehicle occupant caused smoke damage, for example, to the upholstery.

Continuing with the above described example, the controller 102 can display the image data on a display 116 or provide an audible notification via a speaker 118 for signaling that the airborne irritant is detected and that an image of the occupant causing smoke damage has been captured. In some examples, the display may include a message indicating that additional vehicle rental charges may apply for cleaning the vehicle interior. It can be appreciated that by detecting the airborne irritant and notifying the vehicle occupant that such a detection has occurred, the vehicle occupant may be reminded that smoking is prohibited. Thus, the system described herein can proactively mitigate the extent of smoke damage to the vehicle interior.

In some examples, the environment sensor 114 can include an impact sensor for detecting impact that is incident, for example, on a body panel of the vehicle. In some examples, the impact sensor can generate data for determining whether the force of the impact to the body panel may correspond to an event resulting in a scratch, dent, paint chip, or other physical damage to the vehicle. In some examples, the impact sensor can be installed about the vehicle body panels, such as door panels, quarter panels, fenders, bumpers, or the like.

In some examples, the environment sensor 114 can include an acoustic sensor positioned proximal to a windshield or a vehicle window. In some examples, the acoustic sensor can detect acoustic input, generate an acoustic signal based on the acoustic input, and determine whether the acoustic signal is similar to an acoustic signal representing a foreign object incident on the windshield or the vehicle window. For example, the acoustic sensor can generate the acoustic signal to determine whether the detected acoustic input may indicate a stone or other foreign object hitting the windshield and causing a chip or crack on glass.

In some examples, the environment sensor 114 can include a shock sensor for detecting vehicle vibration. In some examples, the shock sensor can detect vibration or sudden shock at a vehicle suspension system that is greater than a threshold shock value. For example, the shock sensor can generate data for determining whether the force of an abrupt shock likely corresponds to the vehicle 110 hitting a curb, rolling over a speed bump at a high rate of speed, or other vehicle movement that can cause damage to an underside of the vehicle. As illustrating examples, the shock sensor can be configured to detect shock associated with the vehicle hitting a curb, resulting in wheel rim damage or resulting in damage to vehicle components that are exposed underneath the vehicle. In another example, the shock sensor can be configured to detect shock associated with the vehicle traveling over road obstacles, resulting in vehicle components becoming dislodged (e.g., exhaust pipe dislodging from brackets and dangling along road surface).

In some examples, the environment sensor 114 can include one or more proximity sensors positioned about the vehicle exterior for detecting a distance between the vehicle and a nearby foreign object or obstacle. Further, the vehicle 110 can include one or more image sensors associated with a respective proximity sensor, such that the image sensor may be configured to capture image data of the physical portion of the vehicle proximal to the proximity sensor when the proximity sensor determines that the vehicle may be less than a threshold distance from a foreign object or obstacle. The captured image data may be used for documenting, at approximately the time of the potential vehicle damaging event, changes to the vehicle condition that may cause damage (e.g., scratches, dents, or the like). The controller 102 can associate the detection of the vehicle exterior being less than a threshold distance from a foreign object to images of a potential damage event. In some examples, the image sensor 112 may provide image data representing a series of image captures or a video data stream. The series of image captures or the video data stream may be helpful in scenarios where the damage event may be sudden and a single or discrete image capture may not adequately capture the damage event. For example, the video data stream can capture the damage occurrence at a time that may be before, during, and after the damage event.

It can be appreciated that the environment sensor 114 can include other types of sensors for detecting conditions that may correspond to a potential vehicle damaging event. As described herein, the environment sensor 114 can detect a potential vehicle damaging event, generate data for determining whether a threshold value is reached, and, if so, generate, via the image sensor 112, just-in-time image data for depicting the vehicle condition change (e.g., dents, scratches, tears, evidence of source causing odour, etc.) caused by the detected environment condition.

The vehicle 110 can include a display 116, such as a dashboard LCD or LED screen and/or icons that may be selectively illuminated in the dashboard. The vehicle 110 can include one or more speakers 118 through which audible alerts or other sounds can be played.

The vehicle 110 includes a memory 104 storing processor-executable instructions that, when executed, cause one or more processors to carry out some of the operations described herein. The processor-executable instructions may be in the form of modules, applications, or other computer programs, and may be standalone programs or incorporated into larger programs relating to vehicles.

As an example, the vehicle 110 can include a vehicle inspection application 106 and sensor data 108. The vehicle inspection application 106 can include instructions for generating image data of one or more physical portions of the vehicle 110. The image data can represent the condition of the vehicle 110 at that particular time or time slot. The image data can subsequently be stored as sensor data 108 in the memory 104. In some examples, the image data can be associated with time-stamps such that the image data can be associated with a vehicle condition at the beginning of a vehicle rental (or vehicle share) period, or can be associated with a vehicle condition at any other time period.

As will be described herein, image data can include just-in-time image data that is associated with a physical condition of the vehicle at a time when the environment sensor 114 detects an environment condition that may correspond to a potential vehicle damaging event. Examples of environment condition changes can include introduction of airborne irritants or odours to the vehicle interior, unordinary vibration or shock to the vehicle suspension while the vehicle is in operation, impact by a foreign object incident on an external portion of the vehicle, or other external impetus to the vehicle that can cause vehicle damage.

In some examples, the vehicle inspection application 106 can include instructions, that when executed, cause the processor of the controller 102 to generate, via the image sensor 112, just-in-time image data of one or more physical portions of the vehicle when the controller 102 detects an environment condition corresponding to a potential vehicle damaging device. The just-in-time image data can represent a vehicle condition at a discrete point in time or a time slot subsequent to an initial vehicle inspection (e.g., beginning of a vehicle rental time period). The controller 102 can compare the just-in-time image data (associated with image data when the unordinary environment condition is detected) with initial image data (associated with an initial vehicle condition at the beginning of a vehicle rental period) for identifying vehicle condition changes. The vehicle inspection application 106 can include other instructions that, when executed, cause the processor of the controller 102 to carry other operations as described herein.

It can be appreciated that the vehicle 110 can include other electrical, mechanical, or electro-mechanical components or systems that directly control elements of the vehicle 110. Further, these other electrical, mechanical, or electro-mechanical components may also operate in response to commands or messages from the controller 102.

Figure 2:
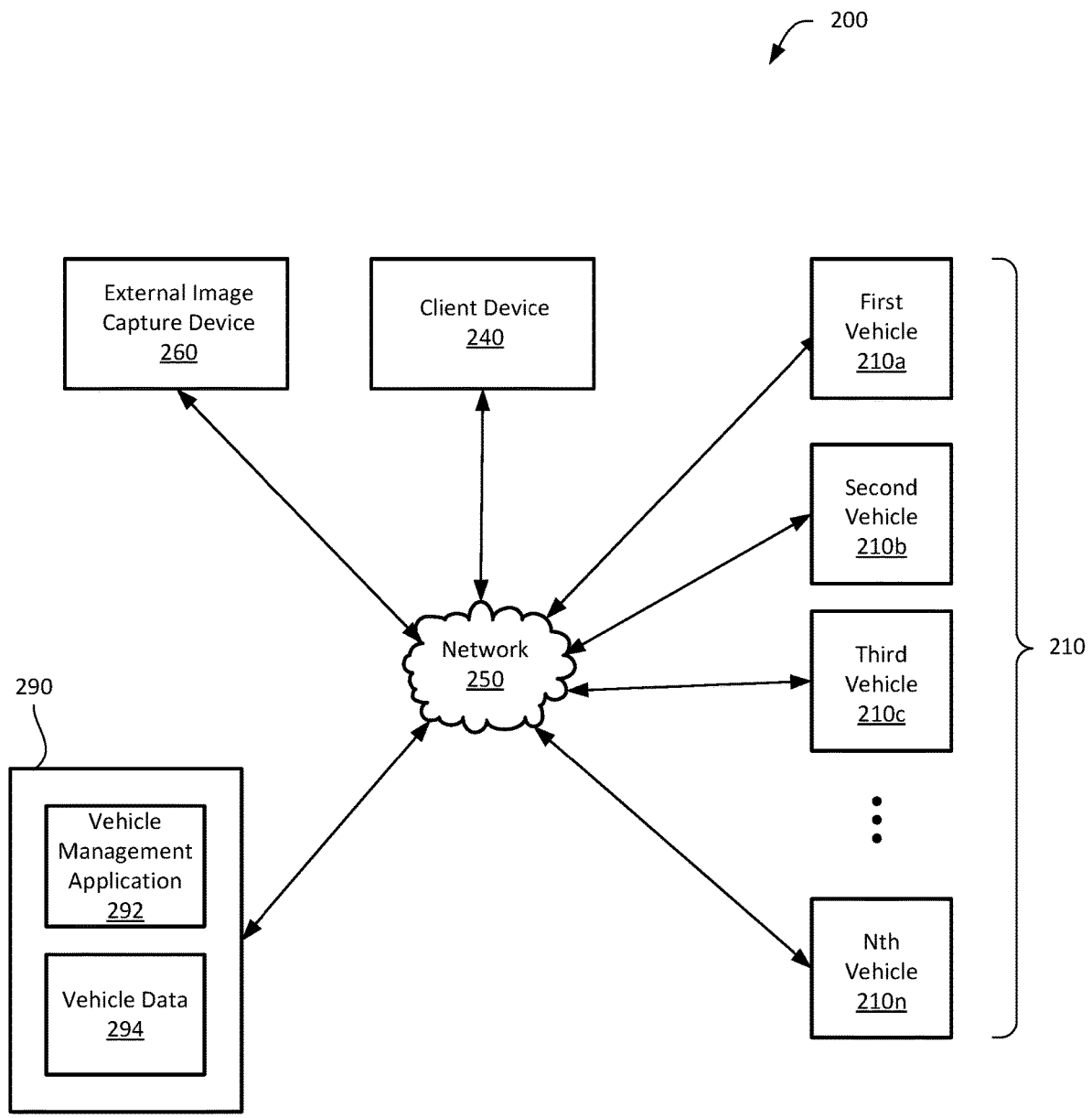
FIG. 2 diagrammatically illustrates an example system, in accordance with an example of the present application.

Reference is now made to FIG. 2, which diagrammatically illustrates an example system 200, in accordance with an example of the present application. The system 200 can include one or more vehicles 210. For example, the system 200 can include a first vehicle 210*a* in wireless communication, via a network 250, with a remote server 290. The system 200 can further include a second vehicle 210*b*, a third vehicle 210*c*, or any number of N vehicles 210*n* that are also in wireless communication with the remote server 290. The network 250 can include a plurality of interconnected wired and/or wireless networks, including the Internet, wireless local area networks, wide area networks, cellular networks, or the like.

The remote server 290 may include one or more computing devices connected to the network 250 and may be configured for data communication with any of the vehicles 210. The remote server 290 may include one or more processors, memory, and processor-executable instructions that, when executed, cause the processors to carry out one or more of the operations described herein. The processor-executable instructions may be in the form of modules, applications, or other computer programs, and may be standalone programs or incorporated into larger programs relating to vehicles.

For example, the remote server 290 may be a vehicle management server operated by a vehicle rental company or a car sharing company, or the like. The remote server 290 may include a vehicle management application 292 for managing vehicles, including the plurality of vehicles 210 of FIG. 2.

In some examples, the remote server 290 can include vehicle data 294. The vehicle data 294 can include data associated with a fleet of rental vehicles that the remote server 290 may manage. The vehicle data 294 may be stored in a database structure for tracking the vehicle make/model, mileage information, vehicle history, or successive image data representing vehicle condition of the respective vehicles 210.

In some examples, the system can include an external image capture device 260 in communication with the remote server 290 or in communication with any one of the vehicles 210. The external image capture device 260 can be an unmanned aerial vehicle (UAV), a drone device, or the like, having an image capture device thereon. The external image capture device 260 can be deployed by any of the devices (e.g., remote server 290, vehicles 210, etc.) of the system 200 to navigate to within geographical proximity of one of the vehicles 210 for capturing image data of a physical portion of the respective vehicle. In some other examples, the external image capture device 260 can be an image capture device operated by a technician at a vehicle return facility for capturing image data representing a vehicle condition of a vehicle. Accordingly, the external image capture device 260 may be operated for capturing image data of the vehicles 210, individually, and the image data can correspond to images captured from a variety of different camera angles.

In some examples, the system can include a client device 240. The client device 240 can be a mobile device that is associated with a vehicle operator of one of the vehicles 210. A respective vehicle 210 or the remote server 290 may transmit a notification message to the client device 240, including image data representing the physical condition of the respective vehicle 210. Further, the notification message can include a request for the vehicle operator to acknowledge or confirm that the image data accurately represents the current physical condition of the vehicle 210.

As an illustrative example, the remote server 290 can conduct operations for managing a vehicle pick-up/vehicle drop-off process for vehicle rental or vehicle sharing. For example, the vehicles 210 may respectively be equipped with one or more image sensors 112 (FIG. 1) and one or more environment sensors 114 (FIG. 1). The image sensors 112 can be within a vehicle for capturing image data of the vehicle interior or can be external to the vehicle for capturing a condition of physical components of the vehicle (e.g., body/door panels, windows, wheel/rim, etc.). The environment sensor 114 can be an odour or electronic nose sensor mounted within the vehicle for detecting airborne irritants, can be impact sensors positioned at one or more body/door panels or bumpers, or the like, as described herein. Upon vehicle pick-up by a vehicle renter, the remote server 290 can initiate the image sensors 112 for generating image data of the physical condition of the vehicle. In some examples, the remote server 290 can initiate the odour or electronic nose sensor for generating an "odour rating" of the vehicle interior (e.g., good/bad rating). For example, if the vehicle interior is free of odours from cigarette smoke or other offensive odour, the initial olfactory condition can be "good"; whereas if the vehicle interior is riddled with cigarette smoke or other airborne irritant, the initial olfactory condition can be indicated as "poor". In some examples, the "odour rating" can be on a sliding scale for providing some quantitative indication of an olfactory condition of the vehicle interior.

The remote server 290 can aggregate the initial image data and the "odour rating" and generate an initial vehicle condition report for transmission to the client device 240. That is, the client device 240 may be associated with the vehicle renter. The vehicle renter may, via the client device 240, receive the initial vehicle condition report, including the image data and "odour rating" data, and can compare the results of the initial vehicle condition report to the actual vehicle for confirming whether the initial vehicle condition report findings reflect the present vehicle condition. The remote server 290 may subsequently receive an acceptance or a decline signal representing feedback from the vehicle renter.

In the event that the vehicle renter disputes the initial vehicle condition report findings as not reflecting the present vehicle condition, the remote server 290 can transmit a signal to a management device for requesting that an inspection agent attend to the vehicle renter/vehicle location. In the event that that the vehicle renter accepts the initial vehicle condition report findings, the remote server 290 may transmit a signal to the vehicle for enabling the vehicle for operation (e.g., enabling the vehicle ignition, unlocking the vehicle doors, providing lockbox location for vehicle keys, etc.). It can be appreciated that the remote server 290 can conduct operations for managing the respective vehicles in a fleet, such as retrieving image sensor or environment sensor data for capturing data representing vehicle condition for the respective vehicles 210.

In some scenarios, when a vehicle renter returns a car to the vehicle rental company, the remote server 290 can transmit a signal to the image sensors 112 or environment sensors 114 to generate image data representing the present vehicle condition (e.g., vehicle condition upon vehicle return) and sensor data representing an olfactory condition of the vehicle interior in a similar way to when the vehicle was picked up by the vehicle renter. Because the image sensors 112 or the environment sensors 114 are positioned on the vehicle at a substantially fixed position, the generated image or sensor data may be obtained from substantially similar field of view or position as when the data was generated on vehicle pick-up. The remote server 290 can generate a vehicle condition report for the vehicle return condition. The vehicle condition report can include substantially side-by-side images comparing the vehicle condition at pick-up and at return. Any detected vehicle damage can be depicted on a display (e.g., at the remote server 290 or at a remote device associated with the vehicle renter) for the vehicle renter to examine and the remote server 290 can generate an invoice associated with the vehicle damage to the vehicle renter.

Figure 3:
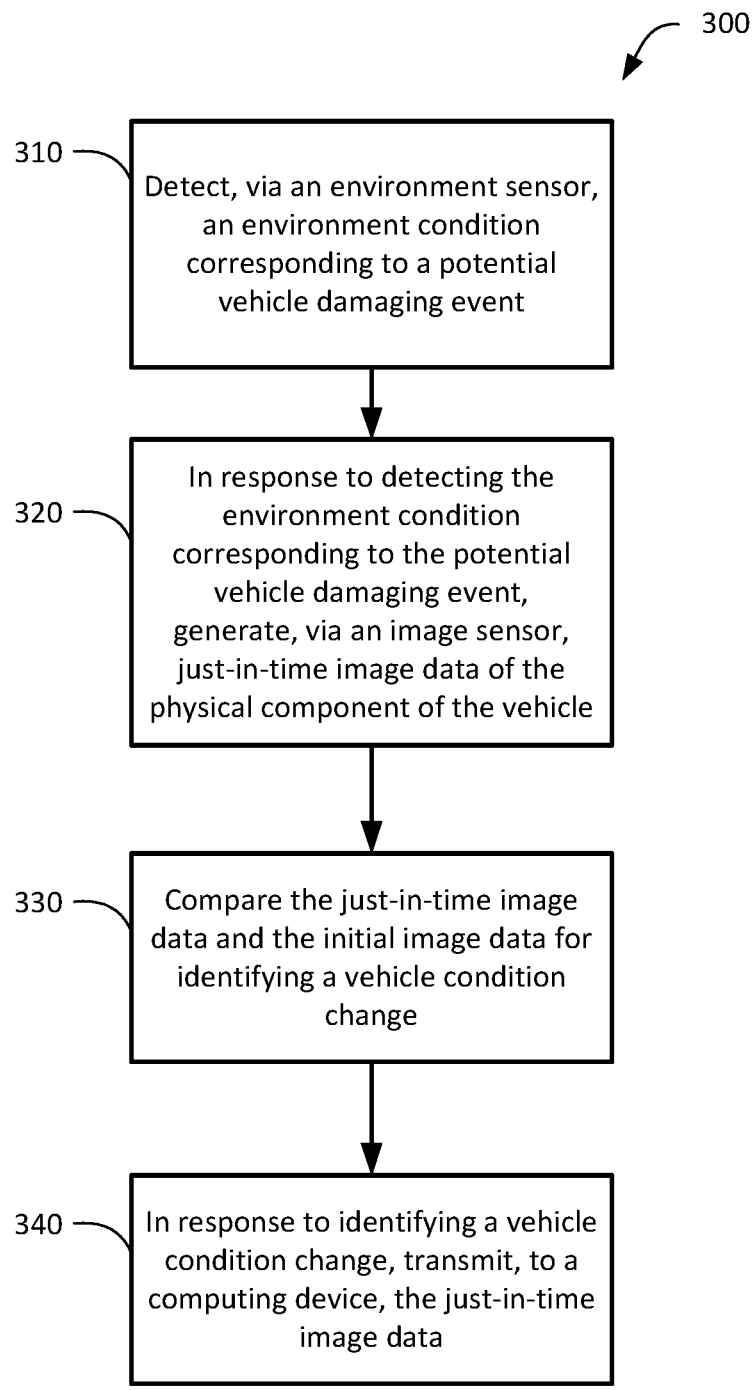
FIG. 3 illustrates, in flowchart form, a method of managing a condition of a vehicle, in accordance with an example of the present application.

Reference is now made to FIG. 3, which illustrates, in flowchart form, a method of managing a condition of a vehicle, in accordance with an example of the present application. The method 300 includes operations that may be carried out by one or more processors of the example vehicle 110 of FIG. 1. The method 300 may be implemented, at least in part, through processor-executable instructions associated with the vehicle inspection application 106 (FIG. 1). In some examples, one or more of the operations may be implemented via processor-executable instructions in other applications or in an operating system and executed in memory of the remote server 110.

The method for managing the vehicle condition of the vehicle can be based on initial image data, and the initial image data can depict an initial condition of a physical component of the vehicle (e.g., vehicle door panel, quarter panel, bumper, etc.). In some examples, the processor can receive the initial image data from one or more image sensors during a vehicle pick-up operation for capturing an initial vehicle condition at the beginning of a vehicle rental period. In some examples, the processor can also receive an initial olfactory condition from an odour sensor within the vehicle for capturing an initial odour condition at the beginning of the vehicle rental period.

At operation 310, the processor detects, via an environment sensor 114 (FIG. 1), an environment condition corresponding to a potential vehicle damaging event. For example, the environment sensor 114 can be an airborne irritant sensor and the processor can detect whether an airborne irritant is within the vehicle causing the environment condition to change. Cigarette or cigar smoke, for example, may be an airborne irritant that can cause smoke damage to the vehicle upholstery. In some examples, the vehicle rental company may prohibit smoking within the vehicle and the environment sensor 114 can detect when vehicle smoke is detected within the vehicle.

In some examples, the environment sensor 114 can be an impact sensor for detecting impact incident on a body or door panel of the vehicle. In some examples, the environment sensor 114 can include an acoustic sensor positioned proximal to a window of the vehicle for detecting acoustic input corresponding to a foreign object incident on the window. In some examples, the environment sensor 114 can include a vibration or shock sensor for detecting sudden or sustained shock to the vehicle that is greater than a threshold value.

In response to detecting the environment condition corresponding to the potential vehicle damaging event, the processor, at operation 320, can generate, via the image sensor 112 (FIG. 1) just-in-time image data of the physical component of the vehicle. In some examples, just-in-time image data can be timely image data that is captured at the onset of a triggering event. For example, in response to an airborne irritant sensor detecting smoke within the vehicle interior, the processor can generate, via an image sensor mounted within the vehicle, image data for capturing image data of the vehicle cabin. The image data of the vehicle cabin may capture the state of the vehicle interior at approximately the time when smoke was detected, thereby providing documented proof that a vehicle occupant was smoking and caused smoke damage to the upholstery. In some examples, the documented proof may be selectively obscured (e.g., to alleviate privacy concerns) yet provide sufficient information for validating that a vehicle renter has smoked within the vehicle.

In some examples, just-in-time image data can be timely image data that is captured upon detected impact to a vehicle body portion and can capture the state of the vehicle body portion at approximately the time when the impact was detected (e.g., vehicle door, bumper, etc.). Thus, the just-in-time image data can capture the vehicle damage (e.g., dent, scratch, etc.) before risk that the vehicle condition may subsequently change in a way that may mask the vehicle damage.

In some examples, the just-in-time image data can be timely image data that is captured upon detected acoustic input corresponding to a foreign object being incident on the window. For example, when the processor detects acoustic input that corresponds to a stone hitting a windshield, the processor can generate, via an image sensor, just-in-time image data of the windshield for capturing the state of the windshield at approximately the time when the stone chip may have occurred. In the present example, the processor can conduct acoustic processing operations for identifying whether an acoustic input includes acoustic characteristics (e.g., pitch, amplitude, tone, etc.) of one or more stones hitting a windshield.

In some examples, the just-in-time image data can be timely image data that is captured upon vibration or shock to the vehicle that is greater than a threshold value. For example, a shock sensor can be associated with the vehicle suspension and the image sensor can be oriented to capture image data of an underside of the vehicle. When the processor detects vibration or shock to the vehicle that is greater than a threshold value (e.g., when the vehicle hits a large pot hole, a curb, or large speed bump at high speed), the processor can generate, via the image sensor oriented at an underside of the vehicle, just-in-time image data for capturing the state of the vehicle underside at approximately the time when the vibration or shock may have occurred. It can be appreciated that just-in-time image data can be timely image data of other portions of the vehicle and the above-described scenarios are illustrating examples.

At operation 330, the processor can compare the just-in-time image data and the initial image data to identify a vehicle condition change. For example, the processor can conduct image processing operations for identifying that just-in-time image data of a driver-side door depicts a dent that is not shown in initial image data depicting an initial vehicle condition (e.g., when the vehicle was picked-up by the vehicle renter). In some other examples, the processor can similarly conduct image processing operations for identifying that just-in-time image data of the vehicle underside depicts an exhaust pipe that is displaced from an expected position depicted in initial image data of the vehicle underside.

In some examples, the processor can identify, by conducting image recognition operations from the just-in-time image data, that one or more vehicle occupants may have lit a cigarette or cigar and may be actively smoking within the vehicle (e.g., prohibited in-vehicle activity, per a vehicle rental company).

In response to identifying the vehicle condition change, the processor, at operation 340, can transmit, to a computing device, the just-in-time image data. That is, the processor can transmit the just-in-time image data to the vehicle display 116 (FIG. 1) and the processor can output at least one of an audible or visual notification for signaling to the vehicle occupant that the potential vehicle damaging event is detected.

In the above-described example where the processor can identify, by image recognition operations, that one or more vehicle occupants may be smoking within the vehicle the processor can output an audible sound for signaling that an airborne irritant is detected and can output a visual notification, such as a textual message or a vehicle interior image based on the just-in-time image data depicting to the vehicle occupant that document proof of smoking within the vehicle has been captured.

In other examples, the processor can transmit the just-in-time image data for display on the vehicle display 116 for depicting a recently detected dent or scratch in the vehicle door, or other vehicle damage condition. In some scenarios where operating the vehicle may further cause vehicle dents or scratches, depicting the recently detected dent or scratch in the vehicle door can provide an indication to the vehicle occupant of the damage and the vehicle occupant can mitigate potential for further damage (e.g., stop vehicle operation).

In some examples described above, operation 330 is conducted by the processor of the vehicle 110. However, in some other examples, operation 330 can be conducted at the remote server 290 (FIG. 2). To do so, in response to generating just-in-time image data of the physical component of the vehicle, the processor can transmit the just-in-time image data to the remote server 290 and the remote server 290 can conduct operations for comparing the just-in-time image data and the initial image data for identifying the vehicle condition change. In the present example, the vehicle may operate akin to a thin client device for conducting operations for detecting an environment condition corresponding to a potential vehicle damaging event and, in response, generating just-in-time image data. The vehicle may then transmit the generated just-in-time image data to the remote server 290 for conducting operations to identify a vehicle condition change.

Figure 4:
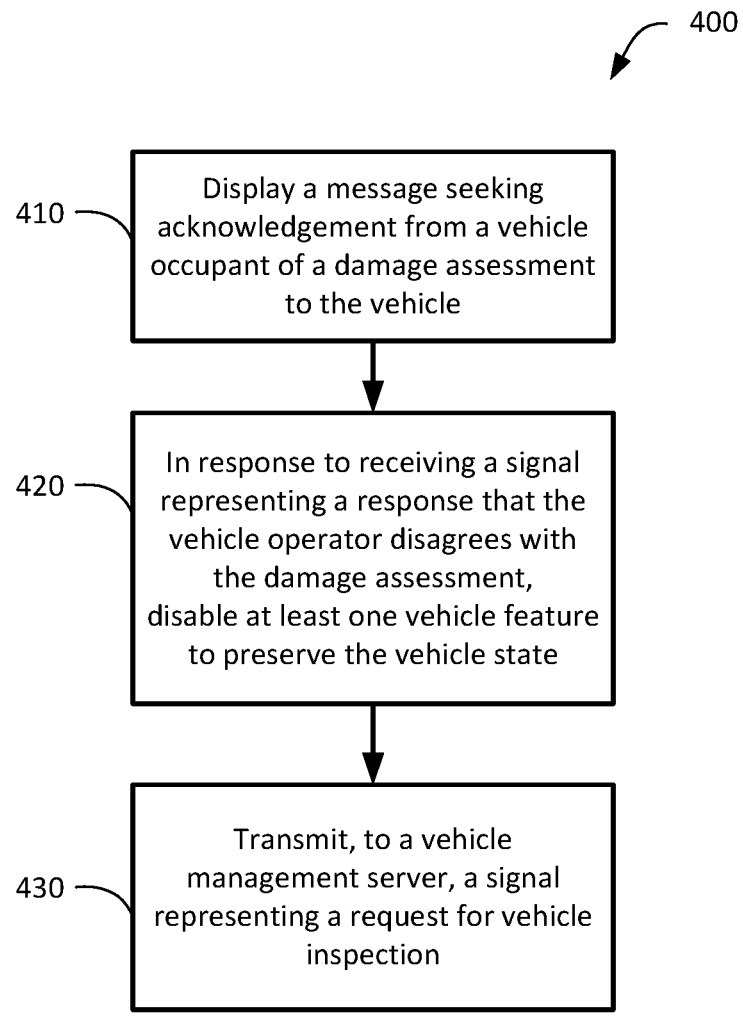
FIG. 4 illustrates, in flowchart form, a method of managing a condition of a vehicle, in accordance with another example of the present application.

Reference is now made to FIG. 4, which illustrates, in flowchart form, a method 400 of managing a condition of a vehicle, in accordance with another example of the present application. The method 400 includes operations that may be carried out by one or more processors of the example vehicle 110 of FIG. 1. The method 400 may be implemented, at least in part, through processor-executable instructions associated with the vehicle inspection application 106 (FIG. 1). In some examples, one or more of the operations may be implemented via processor-executable instructions in other applications or in an operating system and executed in memory of the remote server 110.

In response to identifying a vehicle condition change (e.g., operation 330 of FIG. 3), the processor, at operation 410, can display a message seeking acknowledgement from a vehicle occupant of a damage assessment to the vehicle. In some examples, the processor can display the message on a vehicle heads up display, such as the display 116 (FIG. 1). The message can include user interface elements for detecting signals representing an "accept" or "dispute" options from the vehicle occupant. The displayed message can include images based on the just-in-time image data for displaying timely image data that is captured at the onset of the environment condition change or a triggering event. In some examples, the displayed message can include an image based on initial image data (e.g., depicting an initial vehicle condition at time vehicle renter picked up vehicle) alongside another image based on just-in-time image data (e.g., depicting a timely image illustrating potential damage to the vehicle). In some examples, the image sensor that is used for capturing image data may be positioned on the vehicle at a substantially fixed position for generating the initial image data and the just-in-time image data with a substantially similar view. Thus, operations for comparing the initial image data to the just-in-time image data can compare images captured from a substantially similar field of view (e.g., "apples-to-apples" comparison), thus facilitating increased accuracy of the image comparison operations for identifying vehicle condition changes.

In some examples, the processor can subsequently receive a signal representing a response that the vehicle operator agrees with the damage assessment. The processor can, subsequently, transmit a record of the response that the vehicle operator agrees with the damage assessment to the remote server 290 (FIG. 2) for storage at the vehicle data 294. Accordingly, the record of the detected change in vehicle condition or vehicle damage can be captured and used as documented proof of damage in the event that the vehicle renter disputes charges associated with the vehicle damage.

However, in the scenario where the processor receives a signal representing a response that the vehicle operator disagrees with the damage assessment, at operation 420, the processor can disable at least one vehicle feature to preserve the vehicle state.

For example, in the event that an environment sensor 114 (FIG. 1) such as a shock sensor detects a sudden vibration or shock greater than a threshold shock value, the processor can generate just-in-time image data of the vehicle underside. In the event that the processor determines that the vehicle underside condition has changed, the processor can display a message seeking acknowledgement from a vehicle occupant of a damage assessment to the vehicle. That is, the processor may have identified using image processing operations that one or more components exposed at the vehicle underside may have been displaced or dangling from an expected position. In the event that the processor receives a signal representing a response that the vehicle operator does not see any damage to the vehicle underside condition (e.g., disagrees with the damage assessment), the processor can disable the vehicle to prevent further operation of the vehicle so as to preserve the vehicle state. For example, if a portion of the vehicle exhaust pipe is dangling from an expected position, it may be hazardous to continue operating the vehicle. In other examples, depending on the magnitude of the identified vehicle condition change (e.g., vehicle damage), the processor can disable vehicle features that may have less impact to the vehicle operator.

At operation 430, the processor can transmit, to the remote server 290, a signal representing a request for vehicle inspection. Continuing with the above-described example relating to a portion of the vehicle exhaust pipe dangling from the expected position, the processor can transmit a signal to the remote server 290 a signal representing a request for vehicle inspection. That is, the signal representing the request can be used for dispatching a roadside assistance team for addressing the vehicle damage. In some scenarios, preserving the vehicle state after identifying vehicle condition change that may be indicative of vehicle damage can: (1) mitigate risk of any further damage that can incrementally occur; and (2) allow a vehicle rental company operator to attribute vehicle damage to the present vehicle renter at a time that is close to the time of the damage event.

In some examples, the system 200 (FIG. 2) can include an unmanned aerial image capture device in communication with the vehicle 110 (FIG. 1). The processor of the vehicle 110 may be configured to conduct further operations for capturing further just-in-time image data in response to detecting a changing environment condition corresponding to a potential vehicle damaging event. For example, in response to detecting a potential vehicle damaging event, the processor can broadcast a beacon signal for determining whether the unmanned aerial image capture device is in close proximity to the vehicle. In response to determining that the unmanned aerial image capture device is in close proximity to the vehicle, the processor can transmit a signal representing instructions for capturing aerial just-in-time image data of the vehicle. The aerial just-in-time image data can provide additional image data to the vehicle 110 or to the remote server 290 for identifying vehicle condition changes and for documenting proof of damage at a time or time slot that is proximal to the detected environment condition change. It can be appreciated that just-in-time image data from one or more image sensor sources can be used as documented proof of damage in the event that the vehicle renter disputes charges associated with the identified vehicle damage. Further, capturing and processing just-in-time image data may assist vehicle rental companies or vehicle sharing companies with minimizing costs relating to latent or after-the-fact discovery of damage that may have been masked by dirt or other substances that may obscure minor vehicle damage.

In some other examples, the system 200 can include a vehicle return facility having a driveway having an archway with image capture devices mounted thereon. The system 200 can capture, via the archway of image capture devices, image data of the vehicle condition upon the vehicle leaving the vehicle rental facility and can capture, via the archway of image capture devices, image data of the vehicle condition upon the vehicle returning to the vehicle rental facility. The image data captured by the archway of image capture devices can provide additional image data for identifying vehicle condition changes and for additional visual proof of damage, in the event that the vehicle renter disputes the vehicle condition. It can be appreciated that the system 200 can associate time stamps or other meta-data like information to the captured image data.

Figure 5:
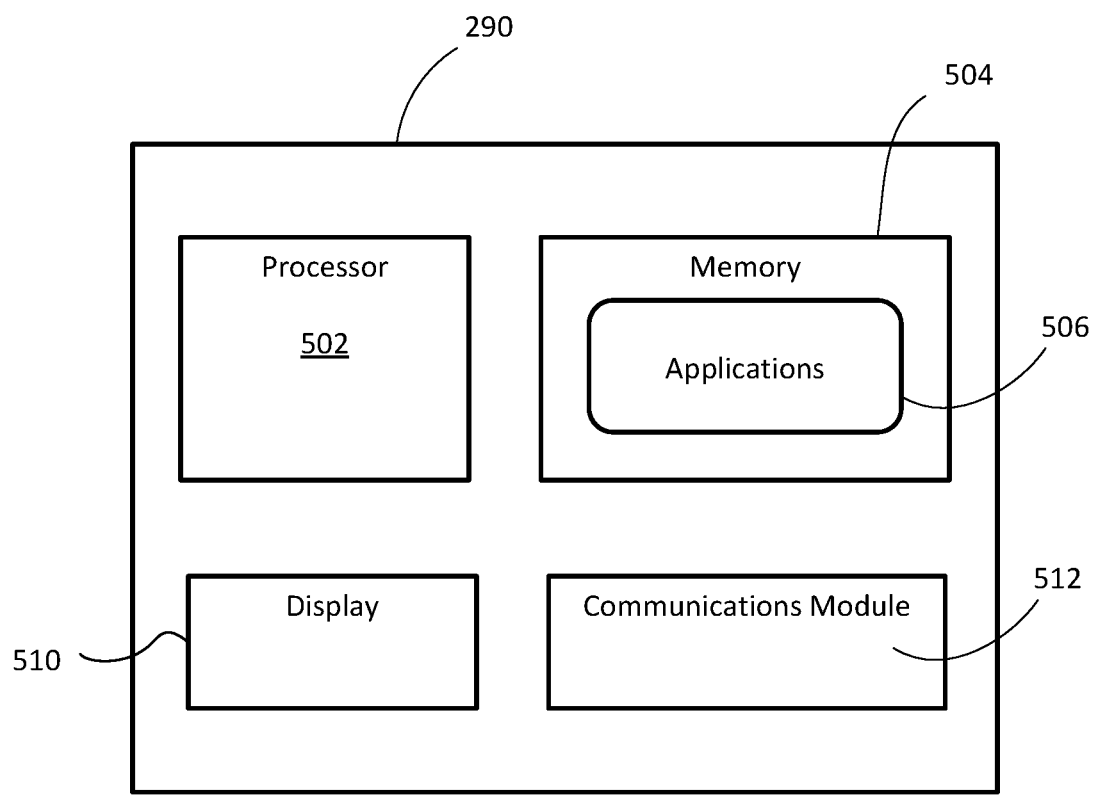
FIG. 5 illustrates a simplified block diagram of a remote server, in accordance with an example of the present application.

Reference is now made to FIG. 5, which illustrates a simplified block diagram of the remote server 290 of FIG. 2, in accordance with an example of the present application. The remote server 290 can include one or more processors 502 and memory 504. The memory 504 stores processor-executable software or applications 506, such as the vehicle management application 292 (FIG. 2). The software or applications 506 can contain instructions implementing the operations or functions of the systems described herein. The memory 504 can also store vehicle data 294 (FIG. 2) which can include vehicle data associated with respective vehicles of a fleet of rental or car share vehicles.

The remote server 500 also includes a communications module 512 for transmitting and receiving data to and from other devices described herein. In some examples, the remote server 500 includes a display 510 or display interface for providing visual output to a user of the remote server 290.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A vehicle inspection system for managing a condition of a vehicle based on initial image data, the initial image data depicting an initial condition of a physical component of the vehicle, the system comprising:
   a processor;
   an image sensor coupled to the processor;
   an environment sensor coupled to the processor; and
   a memory coupled to the processor, the memory storing processor-executable instructions that, when executed, cause the processor to:
      generate, via the image sensor, initial image data depicting an initial condition of the physical component of the vehicle;
      display a message inquiring whether the vehicle operator acknowledges a damage assessment to the vehicle;
      in response to receiving a signal representing a response that the vehicle operator agrees with the damage assessment, enable the vehicle for operation;
      detect, via the environment sensor, an environment condition corresponding to a potential vehicle damaging event and, in response, generate, via the image sensor, just-in-time image data of the physical component of the vehicle;
      compare the just-in-time image data and the initial image data to identify a vehicle condition change; and in response to identifying a vehicle condition change, transmitting, to a computing device, the just-in-time image data, the image sensor positioned on the vehicle at a substantially fixed position for generating the initial image data and the just-in-time image data with a substantially similar field of view.

2. The vehicle inspection system of claim 1, wherein the just-in-time image data includes a series of image captures or a video data stream.

3. The vehicle inspection system of claim 1, wherein the environment sensor includes an airborne irritant sensor, and wherein the image sensor includes an in-vehicle image sensor for capturing image data of the vehicle interior.

4. The vehicle inspection system of claim 3, wherein the airborne irritant sensor is configured to detect smoke within the vehicle interior.

5. The vehicle inspection system of claim 3, wherein the instructions, when executed, further cause the processor to:
detect that an airborne irritant is present within the vehicle and, in response, output at least one of an audible or visual notification for signaling that the airborne irritant is detected and for displaying a vehicle interior image based on the just-in-time image data.

6. The vehicle inspection system of claim 1, wherein the image sensor is positioned at a side view mirror and oriented for capturing image data of at least one of a door panel, a quarter panel, or a fender of the vehicle to identify at least one of a scratch, dent, or paint chip.

7. The vehicle inspection system of claim 1, wherein the physical component of the vehicle is a body panel of the vehicle, and wherein the environment sensor includes an impact sensor for detecting impact incident on the body panel, and wherein the image sensor is an externally mounted image sensor oriented for capturing image data of the body panel.

8. The vehicle inspection system of claim 1, wherein the physical component of the vehicle is a window, and wherein the environment sensor is an acoustic sensor positioned proximal to the window for detecting acoustic input corresponding to a foreign object incident on the window, and wherein the image sensor is oriented to capture image data of the window.

9. The vehicle inspection system of claim 1, wherein the physical component of the vehicle is an underside of the vehicle, and wherein the environment sensor is a shock sensor detecting suspension vibration greater than a threshold shock value, and wherein the image sensor is oriented to capture image data of the underside of the vehicle.

10. The vehicle inspection system of claim 1, wherein the instructions, when executed, further cause the processor to:
display a message inquiring whether the vehicle operator acknowledges a damage assessment to the vehicle; and
in response to receiving a signal representing a response that the vehicle operator disagrees with the damage assessment, disable at least one vehicle feature to preserve the vehicle state; and
transmit, to a vehicle management server, a signal representing a request for vehicle inspection.

11. A method of managing a condition of a vehicle based on initial image data, the vehicle including an image sensor and an environment sensor, the initial image data depicting an initial condition of a physical component of the vehicle, the method comprising:
generating, via the image sensor, initial image data depicting an initial condition of the physical component of the vehicle;
displaying a message inquiring whether the vehicle operator acknowledges a damage assessment to the vehicle;
in response to receiving a signal representing a response that the vehicle operator agrees with the damage assessment, enabling the vehicle for operation;
detecting, via the environment sensor, an environment condition corresponding to a potential vehicle damaging event and, in response, generating, via the image sensor, just-in-time image data of the physical component of the vehicle;
comparing the just-in-time image data and the initial image data to identify a vehicle condition change; and
in response to identifying a vehicle condition change, transmitting, to a computing device, the just-in-time image data,
the image sensor positioned on the vehicle at a substantially fixed position for generating the initial image data and the just-in-time image data with a substantially similar field of view.

12. The method of claim 11, wherein the image sensor is positioned at a side view mirror and oriented for capturing image data of at least one of a door panel, a quarter panel, or a fender of the vehicle to identify at least one of a scratch, dent, or paint chip.

13. The method of claim 11, wherein the just-in-time image data includes a series of image captures or a video data stream.

14. The method of claim 11, wherein the environment sensor includes an airborne irritant sensor, and wherein the image sensor includes an in-vehicle image sensor for capturing image data of the vehicle interior.

15. The method of claim 14, wherein the airborne irritant sensor is configured to detect smoke within the vehicle interior.

16. The method of claim 11, wherein the physical component of the vehicle is a body panel of the vehicle, and wherein the environment sensor includes an impact sensor for detecting impact incident on the body panel, and wherein the image sensor is an externally mounted image sensor oriented for capturing image data of the body panel.

17. The method of claim 11, wherein the physical component of the vehicle is a window, and wherein the environment sensor is an acoustic sensor positioned proximal to the window for detecting acoustic input corresponding to a foreign object incident on the window, and wherein the image sensor is oriented to capture image data of the window.

18. A non-transitory computer-readable medium storing processor readable instructions for operating a vehicle inspection system, the vehicle inspection system for managing a condition of a vehicle based on initial image data, the initial image data depicting an initial condition of a physical condition of the vehicle, and wherein the vehicle inspection system includes an image sensor and an environment sensor, and wherein the instructions, when executed, cause a processor of the vehicle inspection system to:
generate, via the image sensor, initial image data depicting an initial condition of the physical component of the vehicle;
display a message inquiring whether the vehicle operator acknowledges a damage assessment to the vehicle;
in response to receiving a signal representing a response that the vehicle operator agrees with the damage assessment, enable the vehicle for operation;
detect, via the environment sensor, an environment condition corresponding to a potential vehicle damaging event and, in response, generate, via the image sensor, just-in-time image data of the physical component of the vehicle;

compare the just-in-time image data and the initial image data to identify a vehicle condition change; and in response to identifying a vehicle condition change, transmitting, to a computing device, the just-in-time image data, the image sensor positioned on the vehicle at a substantially fixed position for generating the initial image data and the just-in-time image data with a substantially similar field of view.

\* \* \* \* \*